(12) United States Patent
Borrelli et al.

(10) Patent No.: US 6,221,480 B1
(45) Date of Patent: Apr. 24, 2001

(54) BROADBAND CONTRAST POLARIZING GLASS

(75) Inventors: Nicholas F. Borrelli, Elmira; Larry G. Mann, Painted Post; George N. Whitbred, III, Campbell, all of NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/319,182

(22) PCT Filed: Nov. 18, 1997

(86) PCT No.: PCT/US97/21227

§ 371 Date: Jun. 2, 1999

§ 102(e) Date: Jun. 2, 1999

(87) PCT Pub. No.: WO98/24624

PCT Pub. Date: Jun. 11, 1998

Related U.S. Application Data

(60) Provisional application No. 60/032,390, filed on Dec. 4, 1996.

(51) Int. Cl.[7] .............................. B32B 17/00; C03C 4/06; C03C 10/16
(52) U.S. Cl. ......................... 428/325; 65/30.11; 65/32.3; 501/32; 501/13
(58) Field of Search ................... 501/32, 11, 13; 65/30.11, 32.3, 33.3; 428/325

(56) References Cited

U.S. PATENT DOCUMENTS

| | | | |
|---|---|---|---|
| 3,954,485 | * | 5/1976 | Seward, III . |
| 4,125,405 | * | 11/1978 | Araujo . |
| 4,304,584 | * | 12/1981 | Borelli . |
| 4,479,819 | * | 10/1984 | Borelli . |
| 4,908,054 | | 3/1990 | Jones et al. .......... 65/30.11 |
| 5,122,907 | * | 6/1992 | Slocum . |
| 5,425,046 | * | 6/1995 | Davis, Jr. . |

* cited by examiner

Primary Examiner—Deborah Jones
Assistant Examiner—Jennifer McNeil
(74) Attorney, Agent, or Firm—Milton M. Peterson

(57) ABSTRACT

A polarizing glass article, and a method of making the article, that exhibits a broad band of high contrast polarizing properties in the infrared region of the radiation spectrum, that is phase-separated by precipitating silver, copper, or copper-cadmium halide crystals in the glass within a size range of 200–5000 Å, and that contains elongated silver, copper, or copper-cadmium metal particles formed on or in the halide crystals, and having an elongated aspect ratio of at least 2:1, the article having a contrast ratio of at least 100,000 over a range of at least 300 nm.

8 Claims, 3 Drawing Sheets

BROADBAND CONTRAST POLARIZING GLASS

This application is a 371 of PCT/US97/21227, filed Nov. 18, 1997, and claims benefit of provisional application 60/032,390, filed Dec. 04, 1996.

FIELD OF THE INVENTION

A polarizing glass produced from a phase-separated glass containing silver, copper, or copper-cadmium halide crystals and a method of production.

BACKGROUND OF THE INVENTION

A polarizing effect can be generated in glasses containing silver, copper, or copper-cadmium halide crystals. These crystals can be precipitated in aluminosilicate glasses having compositions containing suitable amounts of an indicated metal and a halogen other than fluorine.

The polarizing effect is generated in these crystal-containing glasses by stretching the glass, and then exposing its surface to a reducing atmosphere. The glass is placed under stress at a temperature above the glass annealing temperature. This elongates the glass, and thereby elongates and orients the crystals. The elongated article is then exposed to a reducing atmosphere at a temperature above 250° C., but not over 25° C. above the glass annealing point. This develops a surface layer in which at least a portion of the halide crystals are reduced to elemental silver or copper (hereafter "metal").

The production of a polarizing glass, then, involves, broadly, these four steps:

1. Melting a glass batch containing a source of silver, copper, or copper-cadmium and a halogen other than fluorine, and forming a body from the melt, 2. Heat treating the glass body at a temperature above the glass strain point to generate halide crystals having a size in the range of 200–5000 Å, 3. Stressing the crystal-containing glass body at a temperature above the glass annealing point to elongate the body and thereby elongate and orient the crystals, and 4. Exposing the elongated body to a reducing atmosphere at a temperature above 250° C. to develop a reduced surface layer on the body that contains metal particles with an aspect ratio of at least 2:1.

The growth of halide particles cannot occur at temperatures below the strain point of the glass because the viscosity of the glass is too high. Higher temperatures, above the annealing point, are preferred for crystal precipitation. Where physical support is provided for the glass body, temperatures up to 50° C. above the softening point of the glass can be employed.

The production process is described in detail in U.S. Pat. No. 4,479,819 (Borrelli et al.). There it is pointed out that the halide crystals should have a diameter of at least about 200 Å in order to assume, upon elongation, an aspect ratio of at least 5:1. When reduction to elemental metal particles occurs, the particles having an aspect ratio of at least 5:1 will display an aspect ratio greater than 2:1. This places the long wavelength peak at least near the edge of the infrared region of the radiation spectrum, while avoiding serious breakage problems during the subsequent elongation step. At the other extreme, if the diameter of the initial halide particles exceeds about 5000 Å, significant haze develops in the glass. This is accompanied by a decreased dichroic ratio resulting from radiation scattering.

The dichroic ratio is a measure of the polarizing capability of a glass. It is defined as the ratio existing between the absorption of radiation parallel to the direction of elongation and the absorption of radiation perpendicular to the direction of elongation. To attain an adequate ratio, the aspect ratio of the elongated halide crystals must be at least 5:1 so that the reduced metal particles have an aspect ratio of at least 2:1.

Crystals having a small diameter demand very high elongation stresses to develop a necessary aspect ratio. Also, the likelihood of glass body breakage during a stretching-type elongation process is directly proportional to the surface area of the body under stress. These are very practical limitations on the level of stress that can be applied to a glass sheet, or other body of significant mass. In general, a stress level of about five thousand psi has been deemed to be a practical limit.

The literature indicates that firing of the elongated body in a reducing atmosphere should be undertaken at temperatures above 250° C., but no higher than 25° C. above the annealing point of the glass. A reduction temperature as high as is compatible with the tendency for crystals to respheriodize is desirable. The time required decreases dramatically with increase in temperature. In particular, there is an abrupt change in the time required to achieve complete reduction above 400° C., that is, above the melting temperature of the metal halide phase. It is thought, although not clearly proven, that the metal from the halide phase grows considerably faster when the halide phase is molten. This experimental fact means that, to carry out the reduction treatment in a practical time interval, requires a temperature above 400° C., preferably above 415° C. Looking at the phenomenon in another way, in order to produce, in a reasonable time, a depth of reduced layer necessary for a high contrast, the reduction treatment must be carried out at a high temperature.

One of the key measures of the effectiveness of a polarizing glass body is its contrast ratio, or, as referred to in the art, contrast. Contrast comprises the ratio of the amount of radiation transmitted with its plane of polarization perpendicular to the elongation axis to the amount of radiation transmitted with its plane of polarization parallel to the elongation axis. In general, the greater the contrast, the more useful, and valuable, the polarizing body.

Another important feature of a polarizing body is the bandwidth over which the body is effective. This property takes into consideration not only the degree of contrast, but the portion of the spectrum within which the contrast is sufficiently high to be useful. A contrast ratio of 100,000 has been taken as a point of reference for comparison purposes. Clearly, the lower the reference contrast, the broader the corresponding bandwidth. We have chosen 100,000 (50 db) because it represents a common high performance value specified for polarizer applications.

The peak contrast wavelength is determined by the aspect ratio of the elongated particle. The aspect ratio increases with the degree of stress applied to stretch the glass, and thereby the crystals. The wavelength at which the peak contrast occurs increases with the aspect ratio. Most applications in the infra-red require a peak in the wavelength range of 1300–1550 nm. However, other applications require contrast peaks outside this range, for example, as low as 600 nm.

Heretofore, it has been necessary to produce polarizing glass articles on an individual basis. Thus, it was necessary to design a separate set of processing conditions tailored to provide the peak contrast for each application wavelength.

Then care had to be taken to control the process quite rigidly. The particle elongation is controlled by controlling the elongating stress applied.

The maximum bandwidth available heretofore has been about 300 nm, with a commercially practical figure being no more than 200 nm.

For example, an article might be designed having a center wavelength (CWL), that is, a contrast peak, at about 900 nm. The article would, however, have an optimum bandwidth of about 200 nm covering the range of 800–1000 run. As a result, the article would not be effective at wavelengths outside this range, e.g. 1240, 1310 and 1560 nm.

It would, of course, be highly desirable to provide a polarizing glass having a much broader bandwidth of contrast ratios above the practical use level that is now available. Ideally, this would extend from the visible into the infrared portions of the spectrum.

It is then a basic purpose of the present invention to meet this need. Another purpose is to provide a polarizing glass that is effective over a broad range of wavelengths. A further purpose is to provide a single polarizing glass article that is broadly useful in a variety of applications. A still further purpose is to provide a method of making such a polarizing glass article.

SUMMARY OF THE INVENTION

The invention resides in a polarizing glass article that exhibits a broad band of high contrast polarizing properties in the infrared region of the radiation spectrum, that is phase-separated by precipitating silver, copper, or copper-cadmium halide crystals in the glass within a size range of 200–5000 Å, and that contains elongated silver, copper, or copper-cadmium metal particles having an elongated aspect ratio of at least 2:1 and formed on or in the halide crystals, the article having a contrast ratio of at least 100,000 over a range of at least 300 nm.

The invention further resides in a method for making a glass article exhibiting a relatively broad band of high contrast polarizing properties in the infrared region of the radiation spectrum from glasses which are phase-separable to form silver, copper, or copper-cadmium halide crystals, the method comprising the steps of:

(a) melting a batch for a glass containing a source of silver, copper, or copper-cadmium and at least one halogen other than fluorine, (b) cooling and shaping the melt into a glass article of a desired configuration, (c) subjecting the glass article to an elevated temperature for a period of time sufficient to generate and precipitate silver, copper, or copper-cadmium crystals in the glass, the crystals ranging in size between about 200 and 5000 Å, (d) elongating the glass article under stress at a temperature above the annealing point of the glass to elongate the crystals and align them in the direction of the stress, and, (e) exposing the elongated glass article to a reducing atmosphere at a temperature above about 250° C., but below about 400° C. to initiate reduction, to silver or copper metal, of spots on, or in, the halide particles to form nuclei, and conducting the reduction at a pressure of at least 10 atmospheres for a period of time sufficient to develop a reduced surface layer on the glass article within which the nuclei are grown into particles of varying aspect ratio deposited in and/or upon said elongated crystals, the aspect ratio being at least 2: 1, whereby the glass article exhibits a relatively broad range of high contrast polarizing properties in the infrared region of the radiation spectrum.

Prior Art

Prior literature of possible interest is listed and described in an attached document.

DESCRIPTION OF THE INVENTION

Figure 1:
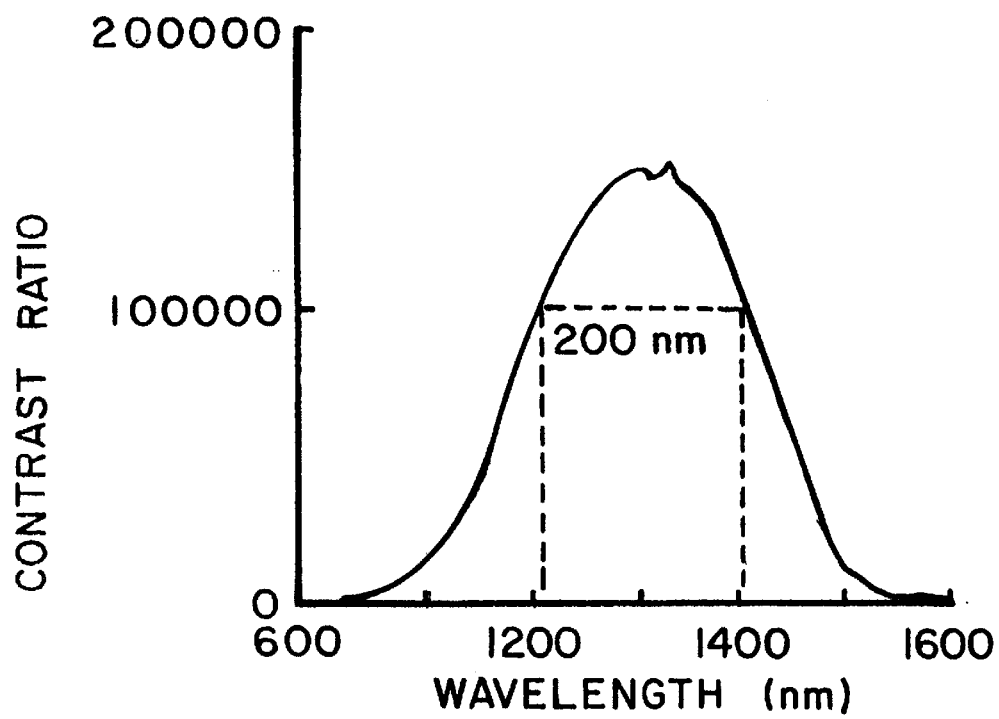
FIG. 1 is a graphical representation showing the contrast ratio curve for a polarizing glass article produced in accordance with prior conventional practice.

The present invention adopts, and improves on, the known method of producing a polarizing glass body. Basically, it embodies the steps of melting a glass containing a source of silver, copper, or copper-cadmium and one or more halogens other than fluorine, forming a body from the glass, and cooling. It further embodies the conventional steps of heat treating the glass body to form and precipitate halide crystals of silver, copper, or copper-cadmium and then heating and subjecting the body to stress to elongate the halide crystals. In accordance with conventional practice, the body is then subjected to a thermal reduction step, preferably in a hydrogen atmosphere, to reduce a portion of the silver or copper halide crystals in a surface layer on the body to elongated metal particles having an aspect ratio of at least 2:1.

Practice of the present invention contemplates employing all of the steps in the conventional manner without changes, except for the final reduction step. The present invention is concerned only with the final step in which reduction of metal halide, to metal takes place. In a broad sense, it is proposed to carry out the reduction step at a lower temperature below 400° C. and at a high pressure. This produces reduced metal particles of a different nature, and that have a different effect on polarizing characteristics.

As indicated earlier, present practice produces a polarizing glass with a relatively narrow bandwidth. Bandwidth is determined by the distribution of elongated particles that result after hydrogen reduction of the stretched glass. In particular, it is the summation of the aspect ratios of the particle shapes. Each shape produces a peak contrast at a different wavelength. The shape of a contrast versus wavelength curve for a polarizing glass is therefore the superposition of the peaks for all the particles.

The aspect ratio of the crystal particles is a function of elongating stress. Consequently, the contrast peak and bandwidth shift across the infrared spectrum depending on the elongating stress. For example, the values for a polarizer effective at 1500 nm are quite different from one effective at 600 nm. With the reduction of the halide to metal in accordance with conventional practice, the aspect ratio changes, but the distribution remains essentially the same.

The present invention is based on a way of producing a broader distribution of metal particle aspect ratios using the same initial halide crystal distribution. It has been observed that reduction of the halide crystals to the metal state occurs very slowly at temperatures below 400° C. It appears that, in order to obtain reduction within a reasonable time under normal practice, it is necessary that the halide be molten. Silver halide melts at 400° C.

The reduction process is pictured as occurring by formation of metal nuclei at spots on, or in, the halide particles. Growth of the nuclei then occurs, but at a very slow rate below 400° C. While ultimate complete reduction of a halide particle would be expected to occur, it has not been observed to occur within any practical time at a temperature below 400° C.

We have now found that the rate of reduction can be greatly increased at a temperature below 400° C. by operating at pressure markedly above the normal one atmosphere. While some effect is achieved at a pressure on the order of 10 atmospheres, it is preferred to operate at 50–100 atmospheres, and even higher if practical. We have found that the reduction rate varies as the square root of the pressure. Also, the reaction proceeds with a dependence on the square root of time. Consequently, by employing a reduction pressure of 100 atmospheres at a given temperature, the time required at one atmosphere is reduced by a factor of 100. This then provides a practical reduction process at a temperature below 400° C.

The significance of this discovery is not simply the ability to operate at a temperature below 400° C. Rather, it is the ability to achieve a much broader bandwidth than heretofore attainable. This is due to the fact that metal particles grown from nuclei on, or in, the metal halide particles have a different shape and aspect ratio from that of the crystal itself. As a result, there are, effectively, a range of other aspect ratios added to the available distribution. This in turn provides the desired broader bandwidth as measured at a contrast of 100,000. Thus, with pressure of 100 atmospheres of hydrogen, we can obtain bandwidths of 700–900 nm, as compared to the commercial value of 200 nm heretofore available.

The glass employed may be any of the known glasses that can be phase-separated to form silver, copper, or copper-cadmium crystals in the glass. Such glasses are disclosed, for example, in U.S. Pat. Nos. 4,190,451 (Hares et al.) and 3,325,299 (Araujo) disclosing photochromic glasses and 5,281,562 (Araujo et al.) disclosing non-photochromic glasses. Each of these patents is incorporated by reference, particularly for its teaching of glass composition ranges and their production. Preferred glasses are those disclosed in the Hares et al. patent.

It is, of course, necessary to form halide crystals of silver, copper, and/or copper-cadmium in the glass article. This may occur during cooling. However, the preferred practice is to cool quickly, and then reheat under controlled conditions to precipitate the necessary crystals. It has been customary to perform the steps at a temperature below 750° C. However, a companion application, provisional no. 60/027,256 filed Sep. 30, 1996 in the names of D. G. Grossman et al., describes a method characterized by heating at a temperature of 750° C. or higher, preferably for at least an hour. This provides various advantages as described in that application.

As indicated, the glass containing halide crystals, must be elongated to stretch and orient the crystals. This prepares the crystals for further treatment to prepare them for reduction to produce a polarizing glass. Conventional practice is to conduct this step at about 710° C.

The present invention is concerned with, and modifies, the final step in which the glass is subjected to a thermal reduction treatment. In accordance with prior practice, the thermal reduction treatment was carried out at a temperature on the order of 415° C. for times of 3–6 hours and at a pressure of one or two atmospheres. It was considered desirable to employ as high a temperature as compatible with the tendency to respheriodize.

In contrast, the production treatment step of the present invention is carried out at a temperature below 400° C. and at a high pressure. While some improvement may be obtained at pressures of 5–10 atmospheres, it is more practical to operate at a higher pressure, for example, 100 atmospheres reducing gas pressure. The maximum pressure is dependent on the capability of the chamber employed.

As explained earlier, this modified reduction treatment permits achieving high contrasts over a much broader bandwidth. Our preferred practice, then, is to achieve contrasts greater than 100,000 over a broad bandwidth by exposing the glass to a reducing gas, preferably hydrogen at as high a pressure as practical for a period of one hour at a temperature of 350–380° C.

The time of treatment will depend on the depth of reduction layer desired. While the depth is not critical, we prefer a depth of about 100 m. At temperatures of 350–380° C., this may be obtained in a time of about one hour.

A reducing atmosphere of $H_2$ is most effective. However, this may be diluted for safety considerations, and other known reducing atmospheres may also be employed.

The procedure just described is effective to increase bandwidth across the infra-red spectrum. However, it is most effective at lower wavelengths of 600–1200 nm.

We have further found that the effect at longer wavelengths can be further enhanced by a subsequent treatment at a temperature above 400° C., for example at 415° C. This produces a much shallower reduced layer of about 10–15 m. Strangely enough, the two reduced layers appear to operate independently and do not have a detrimental effect on each other. As a result, the order of treatment is not important. However, it is usually more convenient to conduct the lower temperature treatment first.

The invention is further described with reference to test pieces of glass processed in identical manner, except for the hydrogen atmosphere conditions employed during the reduction step. Data obtained from measurements on the test pieces after the reducing treatments are plotted in the accompanying drawings. The glass employed in making test pieces to obtain the data presented in the drawings has the following composition in % by weight as calculated from the batch on an oxide basis:

| $SiO_2$ | 56.3 | $ZrO_2$ | 5.0 |
|---|---|---|---|
| $B_2O_3$ | 18.2 | $TiO_2$ | 2.3 |
| $Al_2O_3$ | 6.2 | Ag | 0.24 |
| $Na_2O$ | 5.5 | CuO | 0.01 |
| $Li_2O$ | 1.8 | Cl | 0.16 |
| $K_2O$ | 5.7 | Br | 0.16. |

FIG. 1 is a graphical representation in which contrast ratios are plotted on the vertical axis. Wavelengths in nm are plotted on the horizontal axis. The glass test piece employed in this test was stretched at a temperature in the range of 580–610° C. in accordance with commercial practice for attaining a peak central wavelength of 1300 nm. It was then exposed to a hydrogen atmosphere at one atmosphere pressure for four hours at 420° C.

The curve in the drawing is based on contrast ratios of the two components of polarized light as measured between about 800 and about 1500 nm. The horizontal, dashed line shows the wavelength range over which the contrast ratio is over 100,000. The breadth of this range is about 200 nm between 1200 and 1400 nm.

Figure 2:
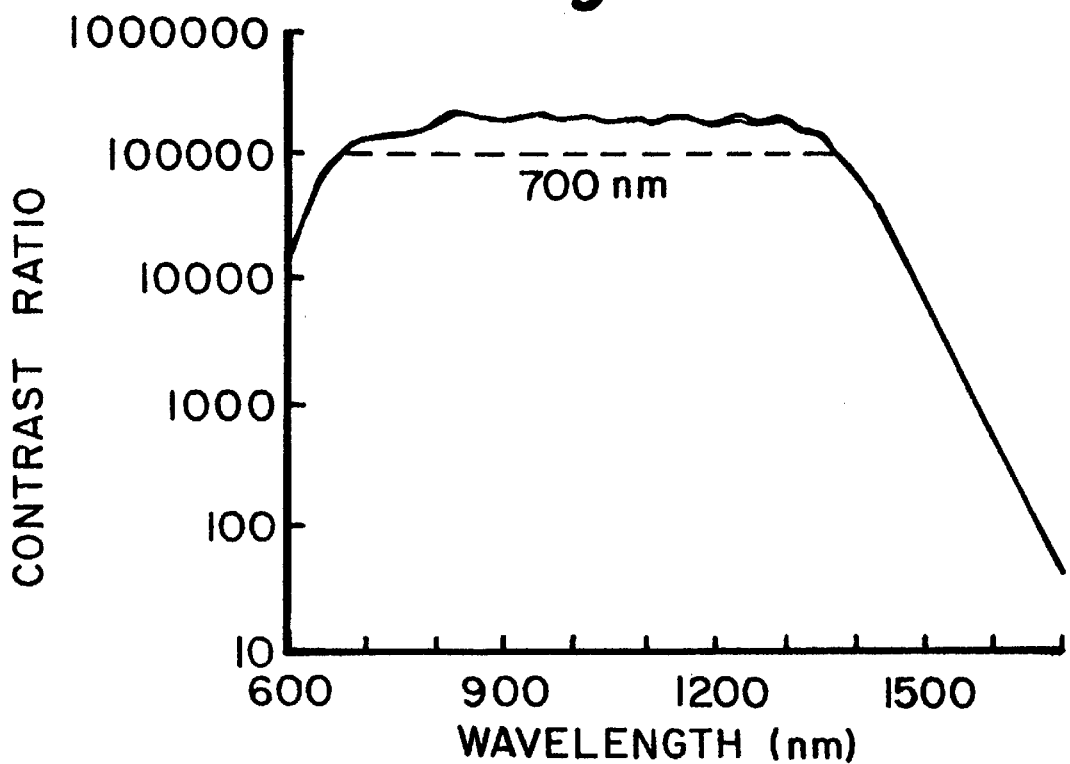
FIGS. 2–5 are graphical representations of typical contrast ratio curves obtained with the present invention.

FIG. 2 is a corresponding graphical representation of data measured on the test piece of FIG. 1 after a subsequent treatment. This treatment was carried out for 1 hours at 350° C. in a hydrogen atmosphere at a pressure of 100 atmospheres.

As in FIG. 1, contrast ratios are plotted on the vertical axis and wavelengths in nm on the horizontal axis. Likewise, the horizontal, dashed line shows the wavelength range over which the contrast ratios are above 100,000 nm. The breadth of this range is about 700 nm and extends between about 700 and about 1400 nm. It is evident that the treatment of the present invention greatly expands the breadth of the range at the 100,000 ratio, as well as extending it down to lower wavelengths. Thus, this polarizer would be effective for use at effective wavelengths of 900, 1100 and 1300 nm.

Similar tests were carried out on comparable test pieces that were stretched at a somewhat higher stress to provide a CWL of about 1480 nm. This produced a breadth of about 240 nm between 1360 and 1600 nm with one test piece subjected to the standard one atmosphere hydrogen pressure at 420° C. Treatment with 100 atmospheres at 350° C. produced a breadth of about 900 nm between about 600 and 1500 nm on the other test piece.

Figure 3:
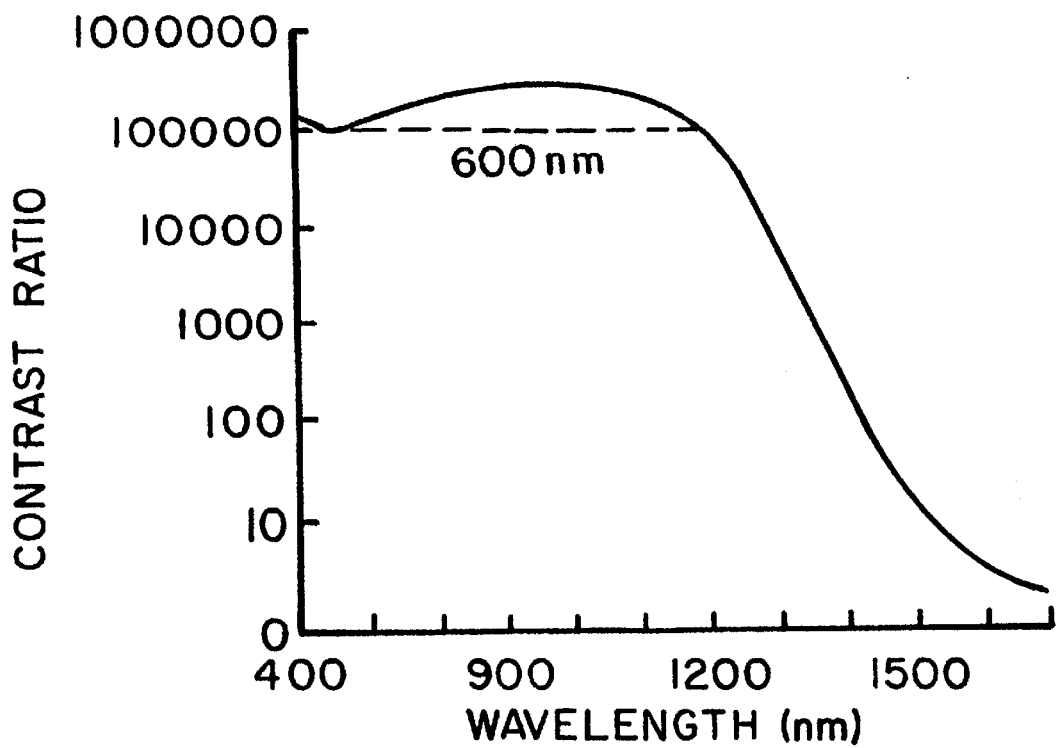

FIG. 3 is a graphical representation corresponding to FIGS. 1 and 2, but showing data measured on another test piece. This test piece was stretched under a stress adapted to produce a CWL of about 900 nm, and received only a single thermoreduction treatment. This treatment was at a temperature of 350° C. for 1 hours with a pressure of 100 atmospheres hydrogen. The curve in the FIG., like that in FIG. 1 is based on contrast ratios of the two components of polarized light measured at wavelengths from 600 to 1700 nm. The dotted line shows the breadth of the wavelength band at a contrast ratio of 100,000. The value is about 600 nm from 600 to 1200 nm.

It will be appreciated that the specific embodiments merely illustrate, rather than limit the invention. Thus, wavelength bands for a contrast ratio of 100,000 may be obtained at different wavelengths by varying the stretching stress.

Figure 4:
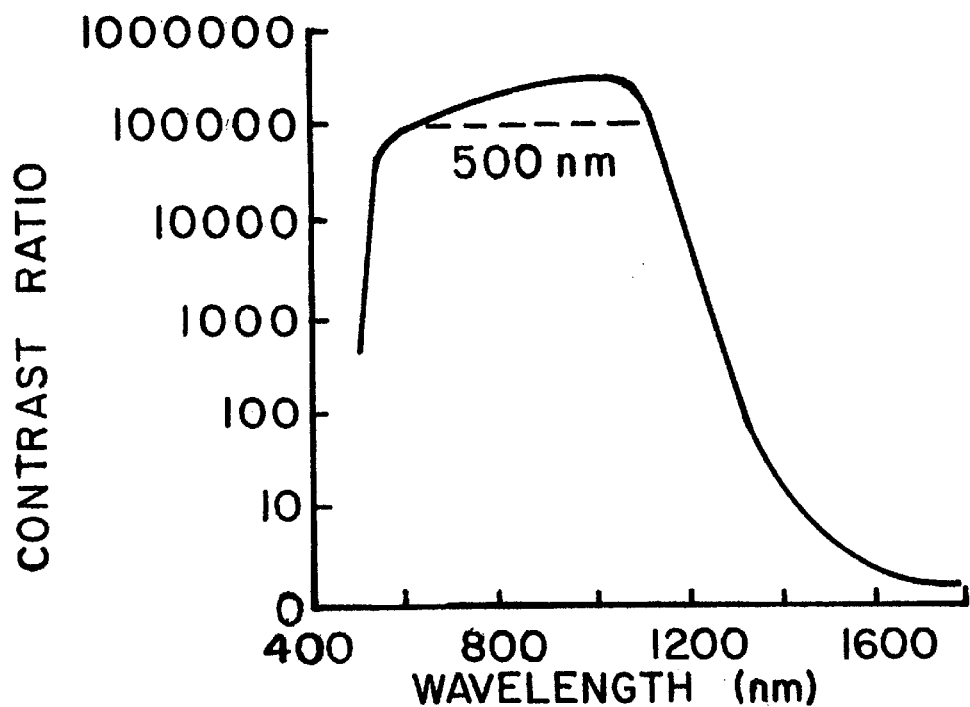
Figure 5:
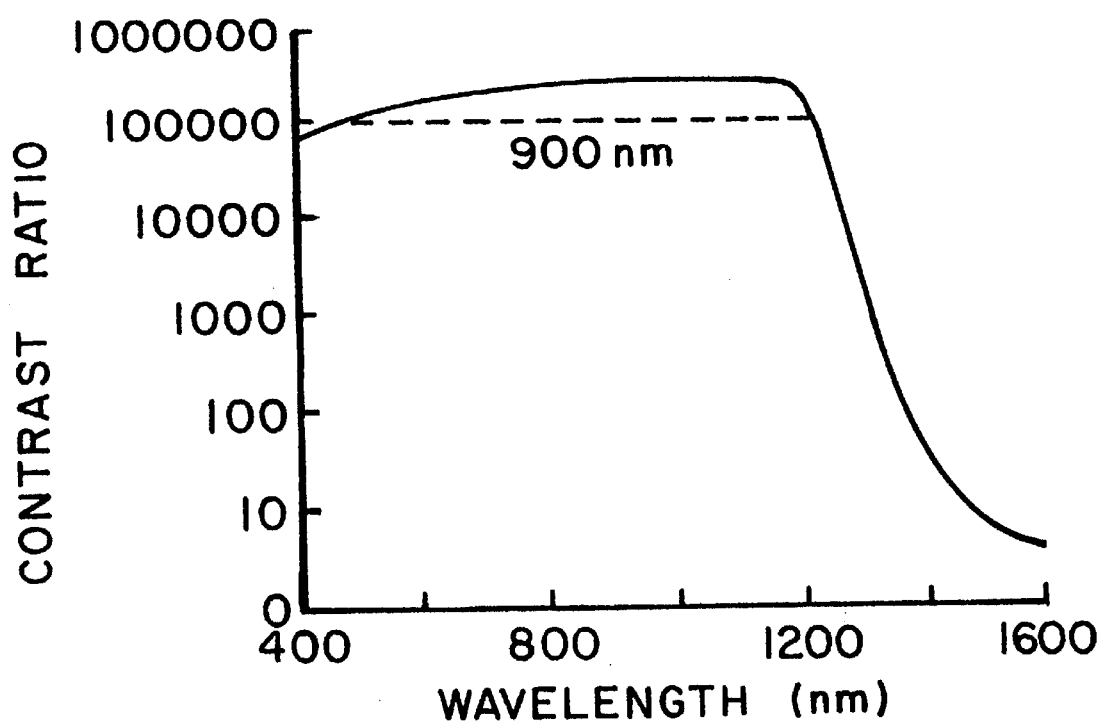

FIGS. 4 and 5 are further graphical representations corresponding to FIGS. 1–3. They show contrast versus wavelength curves for test pieces treated under different conditions.

The test piece represented by FIG. 4 was heated in a hydrogen atmosphere at a pressure of 100 atmospheres for 16 hours at 280° C. While a bit long to be commercially practical, this data illustrates the effectiveness of the invention at a low temperature approaching the minimum temperature of about 250° C. The bandwidth is about 500 nm.

The test piece of FIG. 5 shows the result of reducing a test piece for a present commercial time under a pressure of 100 atmospheres of hydrogen and a temperature of 350° C. This demonstrates that the bandwidth of about 200 nm, obtainable by conventional practice, can be extended to 900 nm, a four to five fold increase.

We claim:

1. A polarizing glass article that exhibits a broad band of high contrast polarizing properties in the infrared region of the radiation spectrum, that is phase-separated by precipitating silver, copper, or copper-cadmium halide crystals in the glass within a size range of 200–5000 Å, and that contains elongated silver, copper, or copper-cadmium metal particles having an elongated aspect ratio of at least 2:1 and formed on or in the halide crystals, the article having a contrast ratio of at least 100,000 over a range of at least 300 nm.

2. A polarizing glass article in accordance with claim 1 having a contrast in excess of 100,000 over a bandwidth of at least 300 nm.

3. A polarizing glass article in accordance with claim 2 wherein the bandwidth is in the range of 400–900 nm.

4. A method for making a glass article exhibiting a broad band of high contrast polarizing properties in the infrared region of the radiation spectrum from glasses which are phase-separable to form silver, copper, or copper-cadmium halide crystals, the method comprising the steps of:

(a) melting a batch for a glass containing a source of silver, copper, or copper-cadmium and at least one halogen other than fluorine, (b) cooling and shaping the melt into a glass article of a desired configuration, (c) subjecting the glass article to an elevated temperature for a period of time sufficient to generate and precipitate silver, copper, or copper-cadmium crystals in the glass, the crystals ranging in size between about 200 and 5000 Å, (d) elongating the glass article under stress at a temperature above the annealing point of the glass to elongate the crystals and align them in the direction of the stress, and, (e) exposing the elongated glass article to a reducing atmosphere at a temperature above about 250° C., but below about 400° C. to initiate reduction, to silver or copper metal, of spots on, or in, the halide particles, and conducting the reduction at a pressure of at least 10 atmospheres for a period of time sufficient to develop a reduced surface layer on the glass article within which the nuclei are grown into particles of varying aspect ratio deposited in and/or upon said elongated crystals, the aspect ratio being at least 2:1, whereby the glass article exhibits a broad range of high contrast polarizing properties in the infrared region of the radiation spectrum.

5. A method in accordance with claim 4 which comprises exposing the article to a pressure of at least 50 atmospheres.

6. A method in accordance with claim 4 which comprises exposing the article at a temperature of at least 280° C.

7. A method in accordance with claim 4 which comprises exposing the article for at least one hour.

8. A method in accordance with claim 4 which comprises further exposing the article at a temperature above 400° C. but not over 25° C. above the glass annealing point.

* * * * *